(12) United States Patent
Kuwabara et al.

(10) Patent No.: US 8,279,238 B2
(45) Date of Patent: Oct. 2, 2012

(54) IMAGE DISPLAY DEVICE AND IMAGE DISPLAY METHOD

(75) Inventors: Akihiro Kuwabara, Osaka (JP); Tamotsu Akeyama, Osaka (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 12/682,124

(22) PCT Filed: Sep. 11, 2008

(86) PCT No.: PCT/JP2008/002514
§ 371 (c)(1),
(2), (4) Date: Apr. 8, 2010

(87) PCT Pub. No.: WO2009/050846
PCT Pub. Date: Apr. 23, 2009

(65) Prior Publication Data
US 2010/0271549 A1      Oct. 28, 2010

(30) Foreign Application Priority Data
Oct. 16, 2007  (JP) .................................. 2007-268546

(51) Int. Cl.
*G09G 5/00* (2006.01)
(52) U.S. Cl. ......... 345/619; 345/581; 345/589; 345/590
(58) Field of Classification Search .................. 345/619, 345/581, 589
See application file for complete search history.

(56) References Cited

U.S. PATENT DOCUMENTS

| | | | | |
|---|---|---|---|---|
| 5,424,754 A | * | 6/1995 | Bar et al. ....................... | 345/549 |
| 5,486,893 A | * | 1/1996 | Takagi ........................... | 396/147 |
| 6,166,719 A | * | 12/2000 | Cariffe .......................... | 345/690 |
| 6,333,752 B1 | * | 12/2001 | Hasegawa et al. ............ | 715/764 |
| 7,046,257 B2 | * | 5/2006 | Ochiai et al. .................. | 345/617 |
| 7,324,749 B2 | * | 1/2008 | Kubo ............................. | 396/429 |
| 2004/0174384 A1 | * | 9/2004 | Ochiai et al. .................. | 345/619 |

(Continued)

FOREIGN PATENT DOCUMENTS

EP       1 293 927 A2     3/2003

(Continued)

*Primary Examiner* — M Good Johnson
(74) *Attorney, Agent, or Firm* — Hamre, Schumann, Mueller & Larson, P.C.

(57) ABSTRACT

An image display device includes: a display part 4 that displays a video image based on an input signal; a video image adjusting part 33 for adjusting a parameter of the video image; and a region selecting part 31 for selecting a region in the video image, with respect to which an adjustment of the parameter is performed. The display part is capable of composing, based a video image in the selected region, a first video image 31*a* before the adjustment of the parameter and a second video image 31*b* to be used for the adjustment, displaying the first video image and the second video image above and below each other or side by side, and displaying either of the first video image and the second video image upside down or in a mirror-reversed manner. By operating the chroma adjusting bar 34, the hue adjusting bar 35, the luminance adjusting bar 36 of the video image adjusting part 33 (image adjustment parameter display screen), the second video image 31*b* is varied, and when a desired video image is obtained, the image is fixed, so that contents of the adjustment are reflected throughout the whole video image. Since the first video image or the second video image is displayed upside down or in a mirror-reversed manner, an influence of the human visual characteristics is eliminated, thereby enabling a precise image quality adjustment.

12 Claims, 7 Drawing Sheets

U.S. PATENT DOCUMENTS

| | | | |
|---|---|---|---|
| 2005/0212814 A1* | 9/2005 | Kubo | 345/614 |
| 2006/0103811 A1 | 5/2006 | May et al. | |
| 2006/0282867 A1 | 12/2006 | Mizuhashi et al. | |
| 2008/0043031 A1* | 2/2008 | Jagmag | 345/581 |
| 2010/0138780 A1* | 6/2010 | Marano et al. | 715/804 |

FOREIGN PATENT DOCUMENTS

| | | |
|---|---|---|
| JP | 07-113766 | 5/1995 |
| JP | 7-113766 A | 5/1995 |
| JP | 2000-242790 | 9/2000 |
| JP | 2000-242790 A | 9/2000 |
| JP | 2002-262218 | 9/2002 |
| JP | 2002-262218 A | 9/2002 |
| JP | 2003-066339 A | 3/2003 |

\* cited by examiner

IMAGE DISPLAY DEVICE AND IMAGE DISPLAY METHOD

TECHNICAL FIELD

The present invention relates to an image display device that outputs images such as a projector device, and an image display method. This invention particularly relates to a technique for facilitating a video image adjustment.

BACKGROUND ART

Conventionally, in an image display device such as a projector device, when a video image is displayed and a user adjusts the video image to a desired video image, a video image before being subjected to an adjustment and a video image used for the adjustment are displayed so that they can be compared, and then a result of the adjustment made to the video image used for the adjustment is reflected on the displayed video image as corrected data.

Among techniques related to such a video image adjustment is the video image correction system disclosed in Patent Document 1. FIG. 11 is a diagram showing a display screen of the video image correction system disclosed in Patent Document 1.

As shown in the figure, as a means to perform a color correction and noise removal on the screen, two screens that are a reference window RW and a task window WW are displayed in a row. While the two screens are compared, a correction is performed using an operation tool bar TB. In performing the correction, an image to be subjected to the correction is displayed on the task window WW, and data derived from a proper frame relevant to the image is pasted onto the reference window RW.

In the above-described manner, an adjustment of a video image can be performed by a simple operation that is easily understandable to a user, and a correction of instability in terms of a position and a color also can be performed easily.
Patent Document 1: JP2002-262218 A

DISCLOSURE OF INVENTION

Problem to be Solved by the Invention

However, the above-described conventional correction method has a problem that due to a visual effect caused by a contrast between a video image to be subjected to a correction and a video image in its original state before being subjected to the correction, the former may be influenced by the latter, thus making it impossible to perform a precise correction. The visual effect caused by a contrast between video images refers to a phenomenon such that, with respect to, for example, two video images each having a gradation from dark to bright, a bright portion at an adjoining area between these two video images looks brighter than it actually is.

When considering the state where a human views an object, care should be taken for the visual effect. In a configuration as simple as that described in Patent Document 1, in which a task window and a reference window are displayed on a screen and a correction is made on the task window, due to the influence of human visual characteristics, an image displayed on the reference window and an image displayed on the task window prior to the correction do not become identical with each other. This makes it difficult to perform a precise adjustment of a video image.

Such an influence due to the visual effect is pronounced particularly in image display devices of a type capable of a large-screen display such as a projector device.

In view of the above-described problem, it is an object of the present invention to provide an image display device and an image display method that allow the influence of the human visual characteristics to be suppressed when video images to be contrasted with each other are displayed side by side or above and below each other in order to perform an adjustment, thereby enabling a precise adjustment of image quality.

Means for Solving Problem

In order to solve the above-described problem with the conventional technique, an image display device according to the present invention includes: a display part that displays a video image based on an input signal; a video image adjusting part for adjusting a parameter of the video image; and a region selecting part for selecting a region in the video image, with respect to which an adjustment of the parameter is performed. The display part is capable of composing, based on a video image in the selected region, a first video image before the adjustment of the parameter and a second video image to be used for the adjustment, displaying the first video image and the second video image above and below each other or side by side, and displaying either of the first video image and the second video image upside down or in a mirror-reversed manner.

An image display method according to the present invention includes steps of: displaying a video image based on an input signal; adjusting a parameter of the video image; and selecting a region in the video image, with respect to which an adjustment of the parameter is performed. In the displaying step, based on a video image in the selected region, a first video image before the adjustment of the parameter and a second video image to be used for the adjustment are composed. The first video image and the second video image are displayed above and below each other or side by side, and either of the first video image and the second video image is displayed upside down or in a mirror-reversed manner.

Effects of the Invention

According to the image display device or the image display method that is characterized by the above-described configuration, either of the first video image and the second video image is displayed upside down or in a mirror-reversed manner, so that common portions of these video images are brought into close proximity to each other, and thus the influence of the human visual characteristics is reduced, thereby enabling a precise adjustment of a video image.

EXPLANATION OF LETTERS OR NUMERALS

Figure 1:
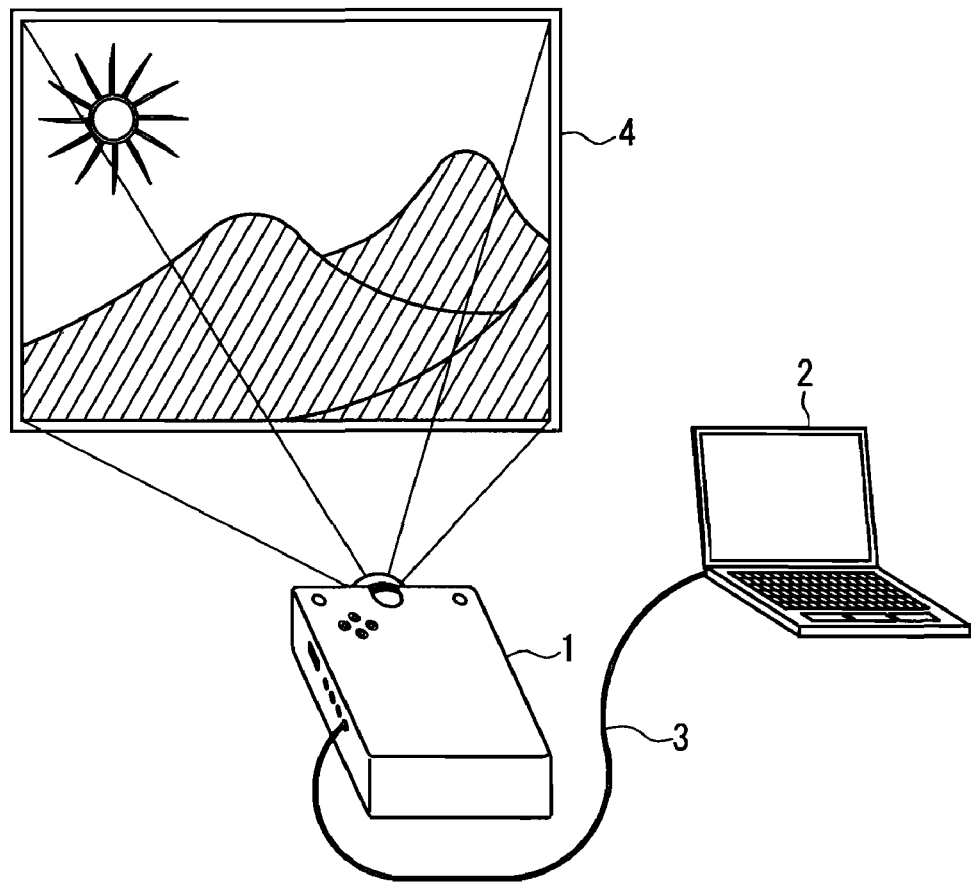
FIG. 1 is a perspective view showing a configuration of an image display system using a projector device as an image display device.

1 projector device
2 personal computer
3 video cable
4 screen
5 VIDEO terminal
6 S-VIDEO terminal
7 RGB/YPbPr input terminal
8 remote control photo detector
9 projection lens
10 direction key
11 decision button
12 external-light sensor
13 remote controller
14 display circuit
15 input selector
16 Y/C separation circuit
17 color decoder
18 matrix circuit
19 input selector
20 input selector
21 A/D converter
22 resize/freeze/on-screen display generator
23 luminance difference detection circuit
24 color difference detection circuit
25 color correction circuit
26 main microcomputer
27 external interface
28a to 28c digital phase-expansion circuit
29a to 29c LCD panel
30 panel driving IC
31 region selecting frame
31a, 31c first video image
31b, 31d second video image
32, 37, 39 boundary line
33 image adjustment parameter display screen
34 chroma adjusting bar
35 hue adjusting bar
36 luminance adjusting bar
38a, 38b detection region
40 isolation frame

DESCRIPTION OF THE INVENTION

The present invention can adopt the following modes on the basis of the above-described configuration.

That is, preferably, in the image display device with the above-described configuration, the parameter includes luminance. The luminance that is influenced most by the visual effect is adjusted, and thus a precise adjustment of a video image can be performed.

Furthermore, preferably, a luminance difference detecting part further is provided that detects a luminance difference between left and right portions or upper and lower portions of the selected region, and based on the detected luminance difference, whether an upside-down display or a mirror-reversed display is to be performed or not is controlled. According to this configuration, video images can be displayed appropriately in a video image adjustment.

Furthermore, preferably, a color difference detecting part further is provided that detects a color difference between left and right portions or upper and lower portions of the selected region, and based on the detected color difference, whether an upside-down display or a mirror-reversed display is to be performed or not is controlled. According to this configuration, video images can be displayed appropriately in a video image adjustment.

Furthermore, preferably, the display part displays a boundary line between the first video image and the second video image, the boundary line having a width corresponding to $\frac{1}{20}$ to $\frac{1}{10}$ a horizontal or vertical number of pixels of the whole video image. Video images arranged in a row are displayed with a predetermined distance between them, and thus the influence of the human visual characteristics further is reduced.

Furthermore, preferably, the display part provides an isolation frame at an outer peripheral portion of the first video image or the second video image, the isolation frame having a width corresponding to $\frac{1}{20}$ to $\frac{1}{10}$ a horizontal or vertical number of pixels of the whole video image. A video image is displayed at a predetermined distance from the whole video image, and thus the influence of the human visual characteristics further is reduced.

Furthermore, preferably, the display part displays portions of the first video image and the second video image, which are desired to be compared, in close proximity to each other by shifting the first video image or the second video image in a direction toward a boundary line between the first and second video images and eliminating overlapping portions of the first and second video images.

Hereinafter, using a projector device as an example, embodiments of the image display device and the image display method according to the present invention will be described with reference to the appended drawings.

Embodiment 1

Figure 2:
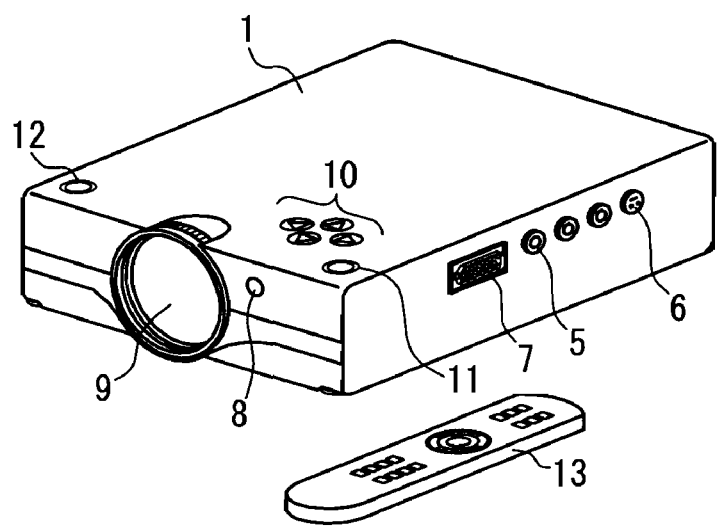
FIG. 2 is a perspective view of a projector device.
Figure 3:
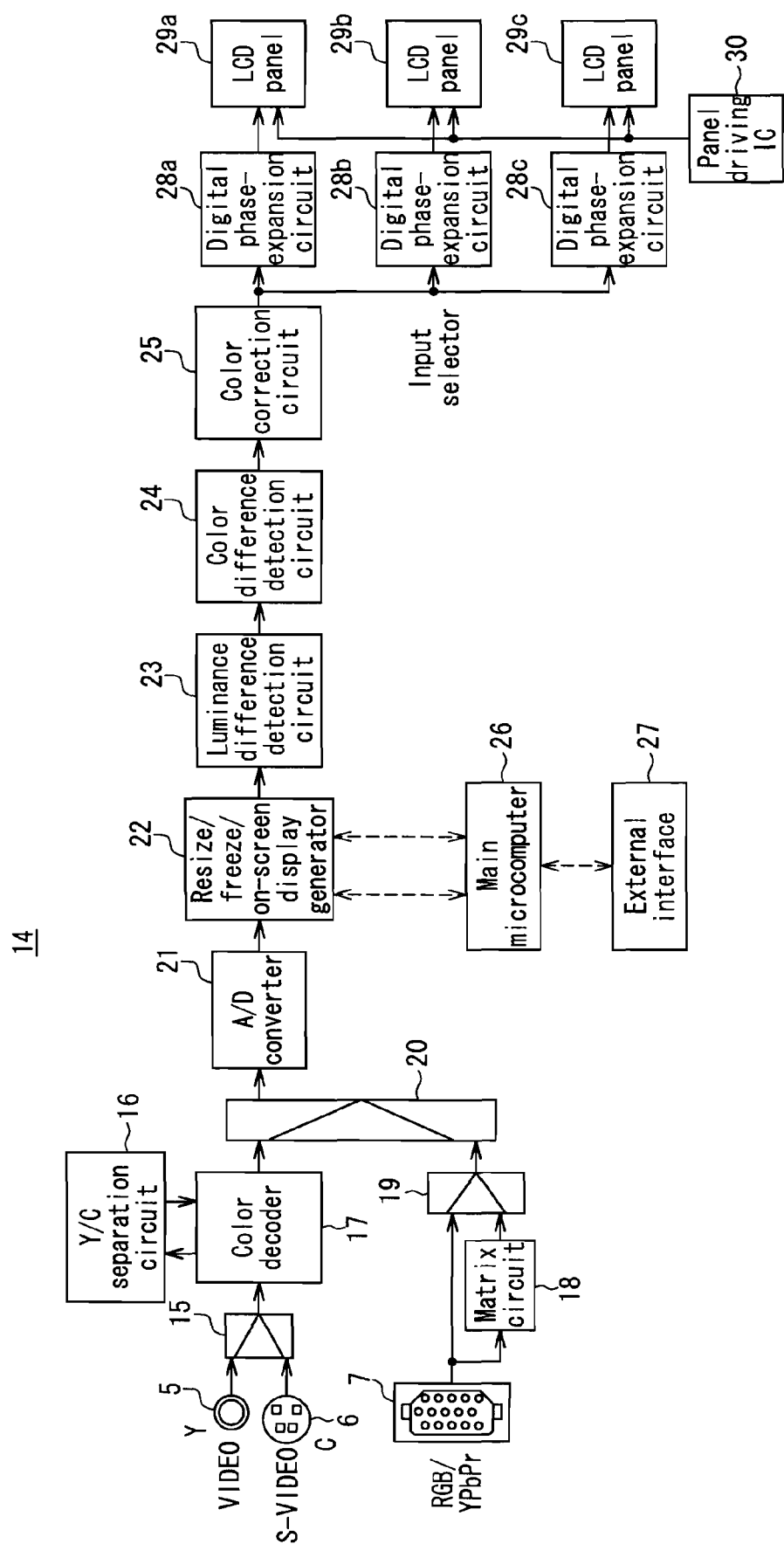
FIG. 3 is a block diagram showing a display circuit of a projector device according to Embodiment 1 of the present invention.
Figure 4:
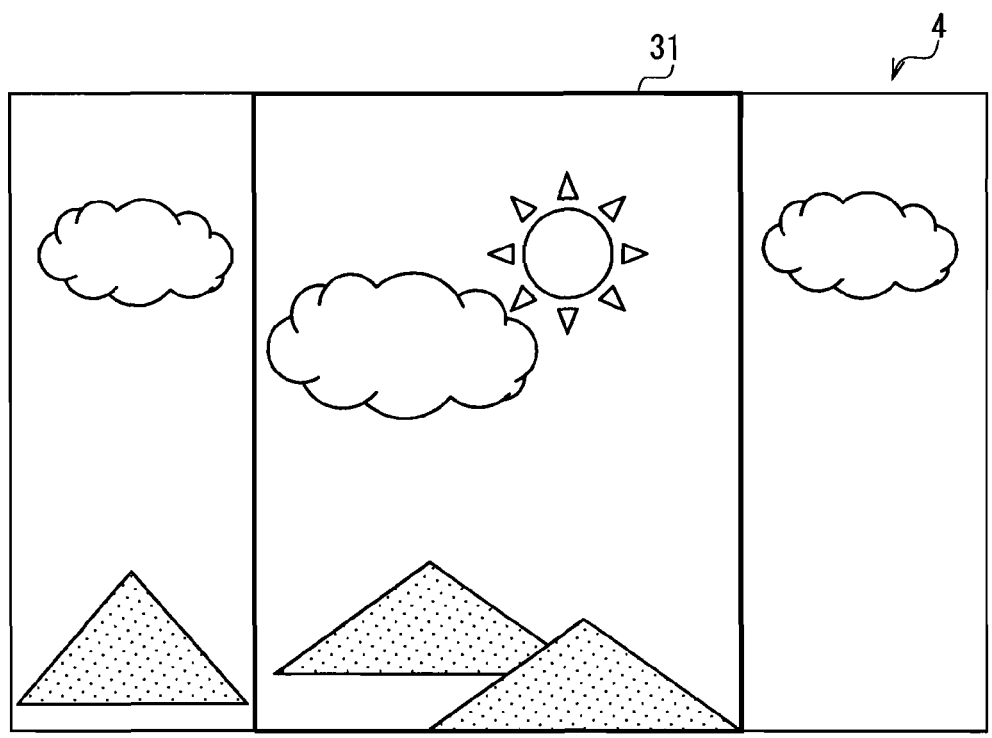
FIG. 4 is a diagram showing an image display screen by the projector device.

FIG. 1 is a structural view showing an image display system using a projector device as an image display device. FIG. 2 is an external view of the projector device, and FIG. 3 is a block diagram showing a display circuit of a projector device according to Embodiment 1 of the present invention.

As shown in FIG. 1, a projector device 1 in the image display system is connected to a personal computer 2 using a video cable 3. A video signal outputted by the personal computer 2 is transmitted to the projector device 1 through the video cable 3. The transmitted video signal is subjected to signal processing and developed on a built-in liquid crystal panel (not shown) to be projected on a screen 4.

By way of example, as shown in FIG. 2, on a casing of the projector device 1, a VIDEO terminal 5, a S-VIDEO terminal 6, a RGB/YPbPr terminal 7, a remote control photo detector 8, a projection lens 9, direction keys 10, a decision button 11, and an external-light sensor 12 are provided. A luminance signal Y, a color difference signal Pb, and a color difference signal Pr that are transmitted from the personal computer 2 are received via the RGB/YPbPr input terminal 7. The external-light sensor 12 detects the illuminance due to external light around the projector device 1. A remote controller 13 is used to operate the projector device 1 from a distant position and is provided with keys and a button capable of the same operations as those performed by means of the direction keys 10 and the decision button 11 of the projector device 1, respectively.

In the following description, as an example, an image represented by a video signal outputted by the personal computer 2 is set to have a resolution of XGA (Extended Graphics Array) including 1024×768 pixels per screen. Further, as an example, the projector device 1 is set to have a configuration in which each pixel is based on the specification expressed by a 1024 levels of gradation from the lowest luminance value to the highest luminance value.

The description is directed next to a display circuit 14 of the projector device 1 in Embodiment 1 of the present invention with reference to FIG. 3 that is a detailed block diagram.

The VIDEO terminal 5 is used for inputting a composite video signal of the NTSC format. The S-VIDEO terminal 6 is used for inputting a S video signal. The RGB/YPbPr terminal 7 is used for inputting a RGB signal or a YPbPr signal.

An input selector 15 has a function of selecting either of a composite video signal inputted via the VIDEO terminal 5 and a S video signal inputted via the S-VIDEO terminal 6.

A Y/C separation circuit 16 is a circuit for separating a composite video signal inputted by a color decoder 17 into a Y signal and a C signal. The color decoder 17 has a function of subjecting a signal resulting from the Y/C separation or an inputted Y/C signal to color decoding so as to obtain a YPbPr signal.

A matrix circuit 18 has a function of performing matrix processing when a YPbPr signal inputted via the RGB/YPbPr terminal 7 is converted into a RGB signal. An input selector 19 has a function of selecting either of a RGB signal inputted via the RGB/YPbPr terminal 7 and a RGB signal generated by the matrix circuit 18.

An input selector 20 has a function of selecting either of analog signals that are a YPbPr signal generated by the color decoder 17 and a RGB signal inputted by the input selector 19. An A/D converter 21 has a function of subjecting an analog signal selected by the input selector 20 to A/D conversion into a 10-bit digital signal.

A resize/freeze/on-screen display generator 22 has a function of resizing a digital signal resulting from the A/D conversion by the A/D converter 21 depending on the number of pixels of LCD (liquid crystal display) panels 29a to 29c, which will be described later, and allowing on-screen images to overlap each other. This circuit also includes a function of adjusting the image quality of a video image.

A luminance difference detection circuit 23 and a color difference detection circuit 24 detect a luminance difference and a color difference between pieces of video image data outputted by the resize/freeze/on-screen display generator 22, respectively. A color correction circuit 25 corrects a color of video image data outputted by the resize/freeze/on-screen display generator 22.

A main microcomputer 26 performs various types of control of the device as a whole such as control of a power supply (omitted in the figure), control of a fan (omitted in the figure), temperature control, input switching control, and the like and also performs control of the color correction circuit 25. An external interface 27 receives a control signal or the like from an external input device such as a personal computer.

Digital phase-expansion circuits 28a to 28c have a function for performing phase expansion of a digital signal in such a manner as to correspond to an operational speed of drivers (omitted in the figure) of the LCD panels 29a to 29c, respectively. A panel driving IC (integrated circuit) 30 has a function for driving the LCD panels 29a to 29c.

The LCD panels 29a to 29c perform a color display of digital signals with respect to which a color correction has been performed by the color correction circuit 25 and phase expansion has been performed by the digital phase-expansion circuits 28a to 28c. The digital signals displayed on the LCD panels 29a to 29c are projected on the screen 4 by the projection lens 9 (see FIG. 2).

The description is directed next to a method of adjusting a video image displayed by projection, which is performed in the projector device 1 according to this embodiment, with reference to FIGS. 4 to 7 that show video image display screens.

First, a video image is displayed by projection on the screen 4 shown in FIG. 1 by the display circuit 14 shown in FIG. 3 and the projection lens 9 shown in FIG. 2. Subsequently, a region selecting frame 31 for selecting a region in the displayed video image, with respect to which an adjustment is desired to be performed, is displayed. The region selecting frame 31 is shifted by operating the direction keys 10 of the projector device 1 or the remote controller 13 shown in FIG. 2, and once it comes into a position coinciding with a portion with respect to which an adjustment is to be performed, the position is fixed by means of the decision button 11 or the remote controller 13.

Figure 5:
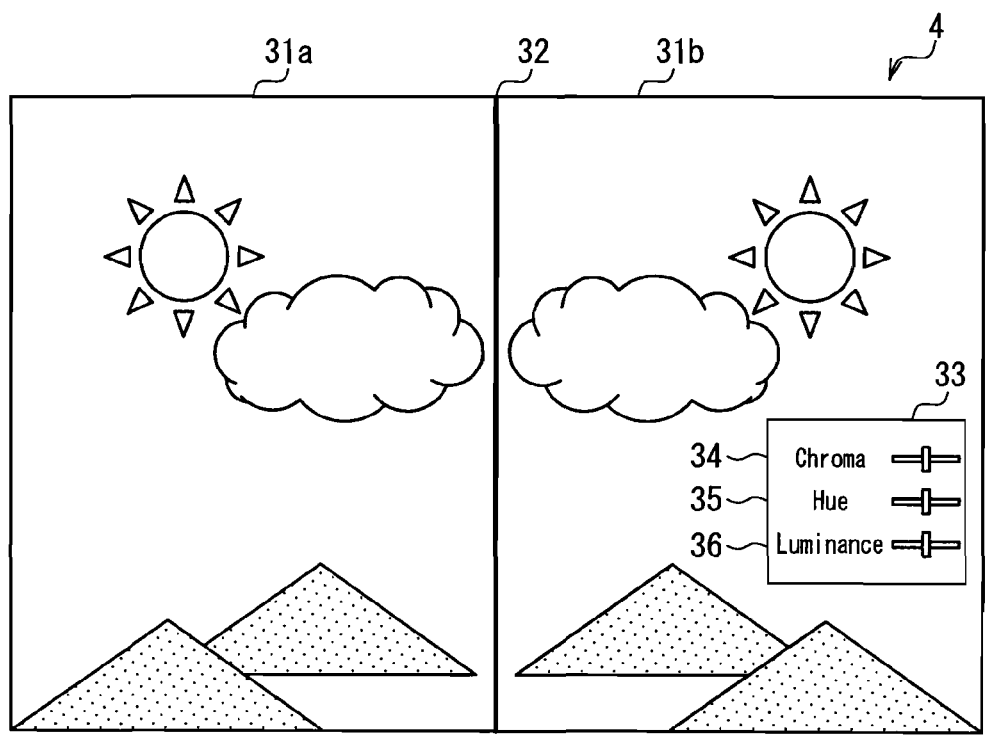
FIG. 5 is a diagram showing an image adjustment screen displayed by the projector device.

Then, a display on the screen 4 is brought to a state shown in FIG. 5 in which, based on a video image in a region thus selected using the region selecting frame 31, a first video image 31a before an adjustment of a parameter and a second video image 31b to be used for the video image adjustment are composed. In this figure, relative to a boundary line 32, the first video image 31a before the adjustment of a parameter is being displayed on the left side, and the second video image 31b to be used for the video image adjustment is being displayed on the right side.

The first video image 31a on the left side is being displayed in a mirror-reversed manner. On the second video image 31b on the right side, an image adjustment parameter display screen 33 is displayed as a video image adjusting unit. The image adjustment parameter display screen 33 includes a chroma (saturation) adjusting bar 34, a hue (color tone) adjusting bar 35, and a luminance (brightness) adjusting bar 36.

Moving these adjusting bars through the operation of the direction keys 10 or the remote controller 13 causes the second video image 31b on the right side to vary and when the second video image 31b is adjusted to a video image desired by a user, the adjusted video image is fixed by means of the decision button 11 or the remote controller 13, so that contents of the adjustment are reflected throughout the whole video image.

For example, in order to make the color of a sky brighter and more vibrant, if so desired by a user, the luminance adjusting bar 36 and the chroma adjusting bar 34 are operated so that a desired video image can be obtained.

Herein, the first video image 31a on the left side is mirror-reversed as a measure to avoid a phenomenon in which when a video image before an adjustment of a parameter and a video image to be used for the adjustment are arranged in a row, these video images may look as if they were different under the influence of the human visual characteristics.

For example, when video images having a large brightness difference therebetween are arranged in a row, to a human, a dark video image looks darker than it actually is, while a bright video image looks brighter than it actually is, which is a characteristic particularly remarkable on a large screen. With respect to this characteristic, when one of the video images is reversed, common portions of these video images are brought into close proximity to each other so as to eliminate a brightness difference, thereby avoiding a phenomenon in which one of the video images may be influenced by the other in close proximity thereto.

Figure 6:
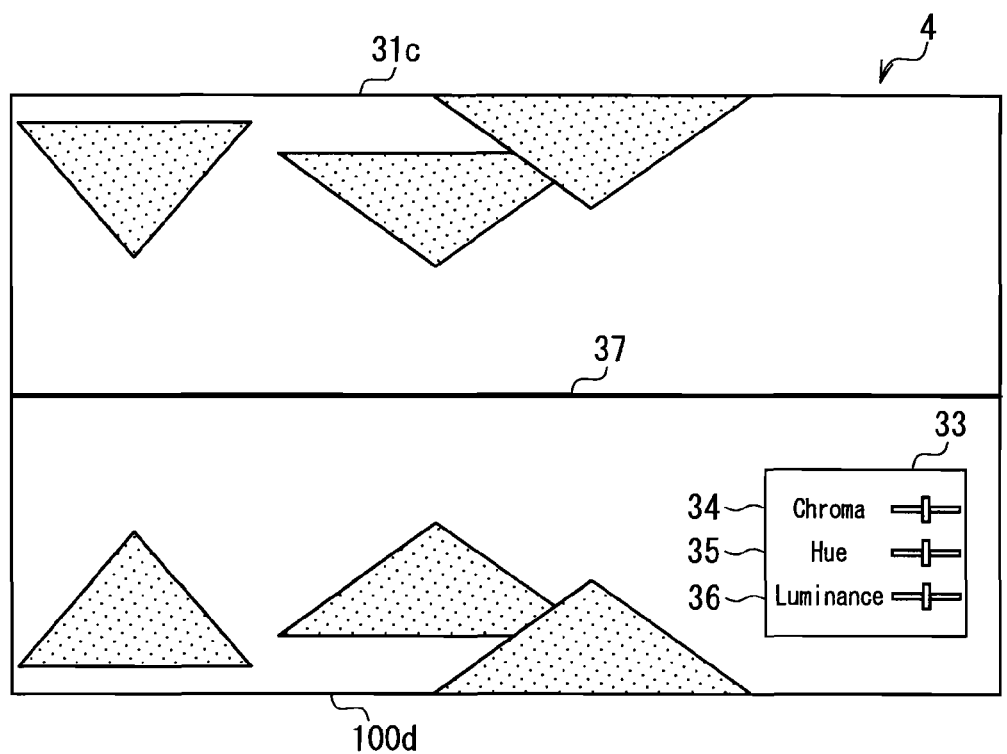
FIG. 6 is a diagram showing another example of an image adjustment screen displayed by the projector device.

The above description uses as an example a configuration in which one of video images is mirror-reversed. It is also possible, as shown in FIG. 6, depending on the selected area of a video image, to arrange a first video image 31c before an adjustment and a video image 31d to be used for the adjustment above and below each other relative to a boundary line 37 between the upper and lower video images. In this case, one of the video images is reversed upside down, and thus a similar effect to the above-described case can be obtained. Further, as the video image to be reversed, either of the video image before the adjustment and the video image to be used for the adjustment may be selected.

As described above, the projector device as an image processing device according to this embodiment includes a video image adjusting unit that performs an adjustment of a parameter of an inputted video image and a region selecting unit that selects a region in the video image, with respect to which the adjustment is performed. Based on the selected region, a video image before the adjustment of the parameter and a video image to be used for the adjustment are displayed above and below each other or side by side, and either of the video images displayed in this manner is displayed upside down or in a mirror-reversed manner, thereby allowing an image quality adjustment desired by a user to be performed precisely.

Figure 7:
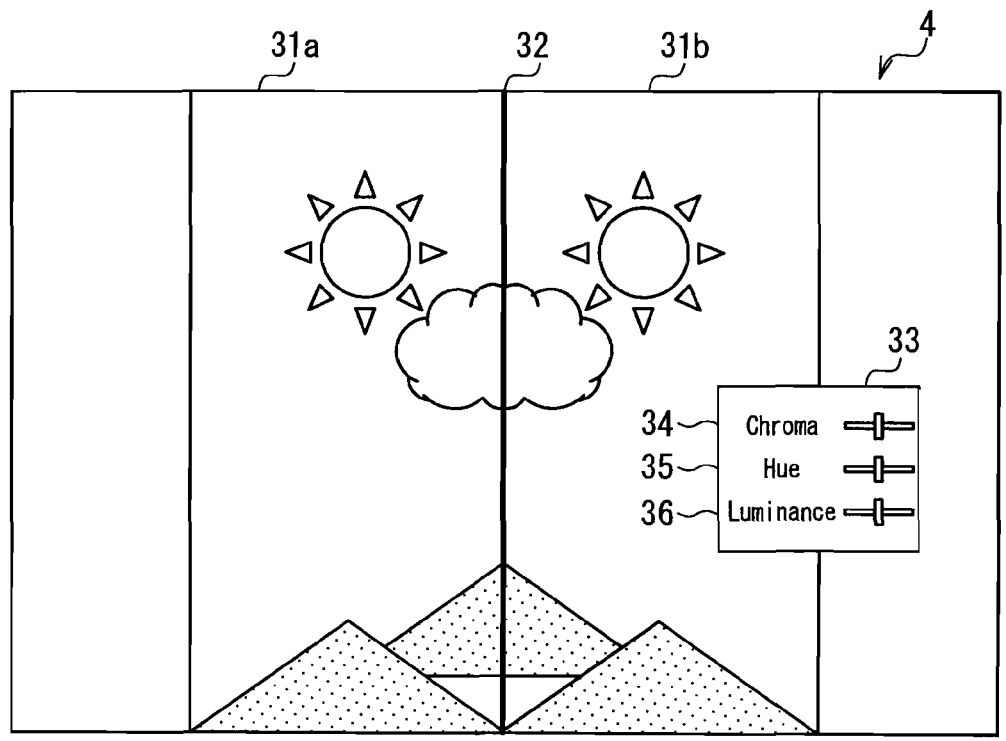
FIG. 7 is a diagram showing still another example of an image adjustment screen displayed by the projector device.

Furthermore, as shown in FIG. 7, it also is possible to shift video images arranged side by side toward a boundary line 32, and eliminate overlapping portions so that portions of the video images that are desired to be compared are brought into close proximity to each other. Similarly, this is possible also in the case where video images are arranged above and below each other.

Embodiment 2

A projector device as an image processing device according to Embodiment 2 of the present invention has the same basic configuration as that of the projector device according to Embodiment 1. The device includes a display circuit 14 that displays an input video image, thereby displaying an image adjustment parameter display screen 33 as an image adjusting unit for an adjustment of a parameter of the video image and a region selecting frame 31 as a region selecting unit for selecting a region in the video image, with respect to which the adjustment is performed. The display circuit 14 further is capable of an operation in which, based on the selected region, a first video image 31a before the adjustment of the parameter and a second video image 31b to be used for the adjustment are displayed above and below each other or side by side, and either of the video images displayed in this manner is reversed upside down or mirror-reversed.

This embodiment is different from Embodiment 1 in that when displaying the first video image 31a and the second video image 31b in a row, reversing either of the video images upside down or in a mirror-reversed manner is not necessarily performed. That is, the reversion is performed depending on the state of a video image.

Figure 8:
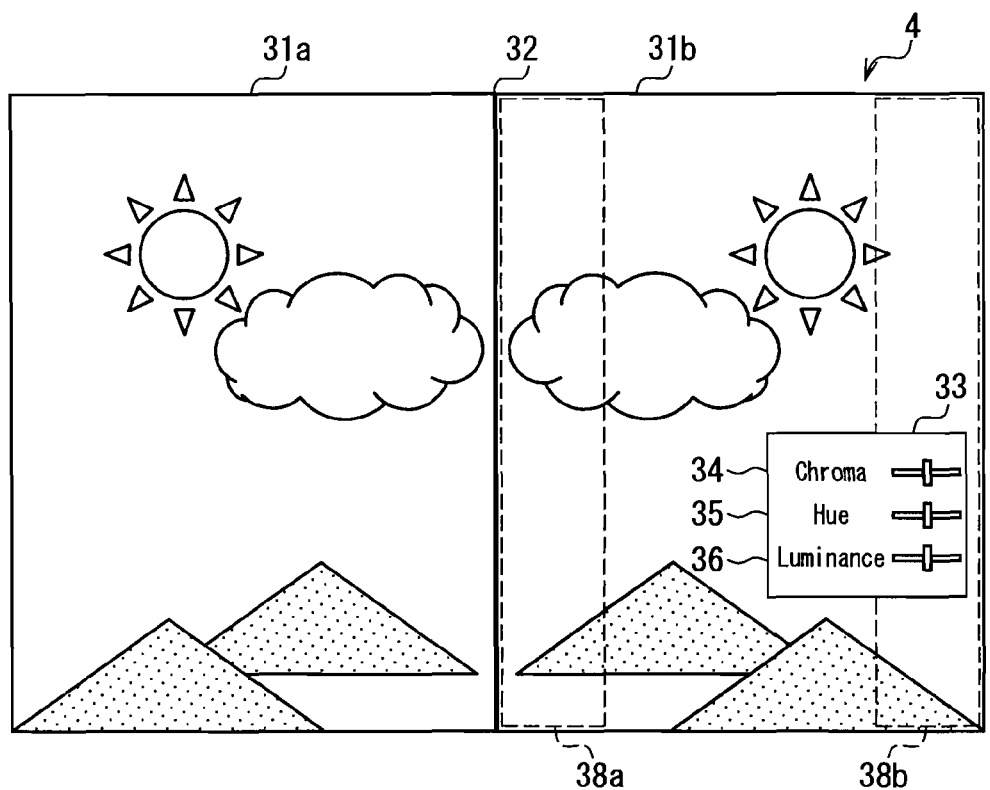
FIG. 8 is a diagram showing an image adjustment screen displayed by a projector device according to Embodiment 2 or 3 of the present invention.

The following describes this embodiment, with a particular emphasis on the difference from the projector device according to Embodiment 1. FIG. 8 is a diagram showing a video image adjustment screen by the projector device according to this embodiment.

This embodiment is different from Embodiment 1 in the following points. That is, in this projector device, detection regions 38a and 38b are provided respectively in right and left portions or in upper and lower portions of a selected region, and a luminance difference between these detection regions 38a and 38b is detected. Then, depending on the detected luminance difference, it is determined whether or not one of the video images is reversed upside down or mirror-reversed.

The description is directed next to a luminance difference detection method used in this embodiment. First, a luminance difference between the left-side and right-side detection regions 38a and 38b of the second video image 31b on the right side relative to a boundary line 32 is detected in the luminance difference detection circuit 23 (see FIG. 3). Control is performed so that one of the video images is mirror-reversed only when the luminance difference has a value larger than a set value and not mirror-reversed when the luminance difference has a value not more than the set value. This secures a state where the video images do not visually appear as if they were different.

For example, it is assumed that with the display resolution being XGA (horizontal 1024 pixels by vertical 768 pixels), the region selected so as to be used for the adjustment (region within the region selecting frame 31) has a size defined by 511 pixels in the horizontal direction by 768 pixels in the vertical direction. Further, it is assumed that each of the left-side and right-side detection regions 38a and 38b in this video image has a size defined by 102 pixels in the horizontal direction by 768 pixels in the vertical direction.

For example, when the left-side and right-side detection regions 38a and 38b have averaged luminance values of 256/1024 levels of gradation and 513/1024 levels of gradation, respectively, they have a luminance difference of 257/1024 levels of gradation. For example, with 192/1024 levels of gradation used as a set value, the luminance difference is larger than the set value, and thus the first video image 31a is displayed in a mirror-reversed manner.

Meanwhile, when the detection regions 38a and 38b have averaged luminance values of 256/1024 levels of gradation and 128/1024 levels of gradation, respectively, they have a luminance difference of 128/1024 levels of gradation. The luminance difference is smaller than 192/1024 levels of gradation as the set value, and thus the first video image 31a is displayed without being mirror-reversed.

As described above, according to the image processing device of this embodiment, a unit that detects a luminance difference between left and right portions or upper and lower portions of a selected region is provided, and depending on the detected luminance difference, a selection is made as to whether one of video images is reversed upside down or mirror-reversed, thereby allowing a user to perform a video image adjustment easily or precisely.

Although this embodiment has been explained using the example of a resolution of XGA, a similar effect is obtained also in the case of using other resolution values. Further, although this embodiment has been explained based on the case of a luminance with 1024 levels of gradation, a similar effect is obtained also in the case of a luminance with 256 levels of gradation or a luminance with other levels of gradation.

Embodiment 3

A projector device as an image processing device according to Embodiment 3 of the present invention has the same basic configuration as that of the projector device according to Embodiment 2. Also in this embodiment, when displaying a first video image 31a before an adjustment of a parameter and a second video image 31b to be used for the adjustment are displayed in a row, an operation of reversing either of the video images upside down or in a mirror-reversed manner is not necessarily performed, and the reversion is performed depending on the state of a video image.

The following describes this embodiment, with a particular emphasis on the difference from the projector device according to Embodiment 2. A drawing to show an image adjustment screen in the projector device according to this embodiment is similar to FIG. 8 used for the explanation of Embodiment 2. However, the projector device according to this embodiment is different from the projector device according to Embodiment 2 in that detection regions 38a and 38b in left and right portions or in upper and lower portions of a selected region are used for detecting a color difference, and depending on the detected color difference, it is determined whether or not one of video images is reversed upside down or mirror-reversed.

The description is directed next to a color difference detection method used in this embodiment. First, a color difference between the left-side and right-side detection regions 38a and 38b of the second video image 31b on the right side relative to a boundary line 32 is detected in the color difference detection circuit 24. Control is performed so that one of the video images is mirror-reversed only when the color difference has a value larger than a set value and not mirror-reversed when the color difference has a value not more than the set value. This secures a state where the video images do not visually appear as if they were different.

For example, it is assumed that with the display resolution being XGA (horizontal 1024 pixels by vertical 768 pixels), the region selected so as to be used for the adjustment has a size defined by 511 pixels in the horizontal direction by 768 pixels in the vertical direction. Further, it is assumed that each of the left-side and right-side detection regions 38a and 38b in this video image has a size defined by 102 pixels in the horizontal direction by 768 pixels in the vertical direction.

For example, with respect to averaged colors in the left-side detection region 38a, it is assumed that a red color has 256/1024 levels of gradation, a green color has 0/1024 levels of gradation, and a blue color has 0/1024 levels of gradation, and similarly, with respect to averaged colors in the right-side detection region 38b, it is assumed that a red color has 0/1024 levels of gradation, a green color has 0/1024 levels of gradation, and a blue color has 256/1024 levels of gradation. In this case, between these regions, the red colors have a color difference of 256/1024 levels of gradation, the green colors have a color difference of 0/1024 levels of gradation, and the blue colors have a color difference of 256/1024 levels of gradation. For example, with 192/1024 levels of gradation used as a set value, the red colors and the blue colors have a color difference larger than this value, and thus the first video image 31a is displayed in a mirror-reversed manner.

Meanwhile, with respect to averaged colors in the left-side detection region 38a, it is assumed that a red color has 256/1024 levels of gradation, a green color has 0/1024 levels of gradation, and a blue color has 0/1024 levels of gradation, and similarly, with respect to averaged colors in the right-side detection region 38b, it is assumed that a red color has 128/1024 levels of gradation, a green color has 0/1024 levels of gradation, and a blue color has 128/1024 levels of gradation. In this case, between these regions, there is a color difference of 128/1024 levels of gradation. This color difference is smaller than 192/1024 levels of gradation as the set value, and thus the first video image 31a is displayed without being mirror-reversed.

As described above, according to the image processing device of this embodiment, a unit that detects a color difference between left and right portions or upper and lower portions of a selected region is provided, and depending on the detected color difference, a selection is made as to whether one of video images is reversed upside down or mirror-reversed, thereby allowing a user to perform a video image adjustment easily or precisely.

Although this embodiment has been explained using the example of a resolution of XGA, a similar effect is obtained also when using other resolution values. Further, although this embodiment has been explained based on the case of a luminance with 1024 levels of gradation, a similar effect is obtained also in the case of a luminance with 256 levels of gradation or a luminance with other levels of gradation. Further, although this embodiment has explained the case where a comparison is made among red, green, and blue colors, the present invention is applicable also to the case of a comparison among Y, Pb, and Pr.

Embodiment 4

A projector device as an image processing device according to Embodiment 4 of the present invention has the same basic configuration as that of the projector device according to Embodiment 1.

The device includes a display circuit 14 that displays an input video image, thereby displaying an image adjustment parameter display screen 33 as a video image adjusting unit for performing an adjustment of a parameter of the video image and a region selecting frame 31 as a region selecting unit for selecting a region in the video image, with respect to which the adjustment is performed. The display circuit 14 further is capable of an operation in which, based on the selected region, a first video image 31a before the adjustment of the parameter and a second video image 31b to be used for the adjustment are displayed above and below each other or side by side, and either of the video images displayed in this manner is reversed upside down or mirror-reversed. This embodiment is different from Embodiment 1 in the configuration of a video image adjustment screen.

Figure 9:
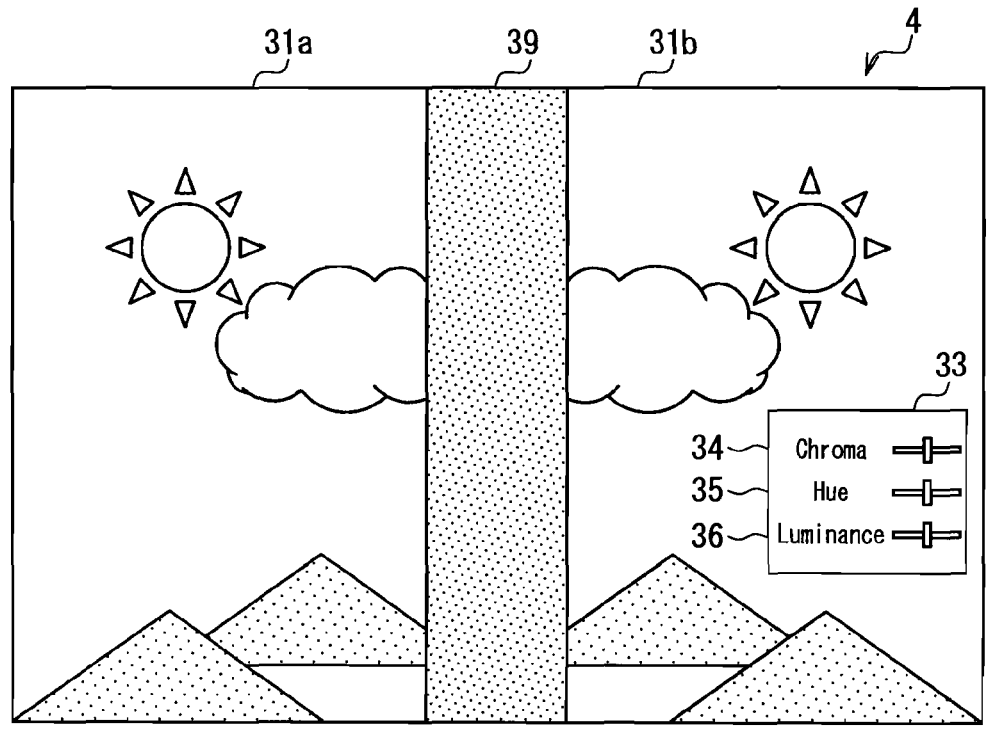
FIG. 9 is a diagram showing an image adjustment screen displayed by a projector device according to Embodiment 4 of the present invention.

The following describes this embodiment, with a particular emphasis on the difference from the projector device according to Embodiment 1. FIG. 9 is a diagram showing a video image adjustment screen in the projector device according to Embodiment 4. In this figure, unlike in the image processing device according to Embodiment 1, a boundary line 39 has an increased width corresponding to 1/20 to 1/10 the horizontal or vertical number of pixels.

The description is directed next to the boundary line 39 defined by the number of pixels in the horizontal or vertical direction, which is used in this embodiment. For example, in the case of XGA (horizontal 1024 pixels by vertical 768 pixels), the boundary line 39 having a width that corresponds to 1/10 the horizontal number of pixels, namely, 102 pixels, is displayed. Further, the first video image 31a and the second video image 31b are displayed on the left and right sides of the boundary line 39, respectively.

This configuration is employed for the purpose of avoiding a phenomenon in which, when two video images are displayed in close proximity to each other, respective portions of these video images that are different in luminance or chroma may be influenced by each other.

Furthermore, when making an adjustment for increasing the brightness or saturation difference, it looks as if the difference is greater than an actual difference due to the visual effect, thus making it impossible to perform a precise adjustment. Such a problem also can be avoided by the boundary line 39 isolating two video images from each other.

In this case, it is desirable that the boundary line 39 have a width corresponding to $\frac{1}{20}$ to $\frac{1}{10}$ the horizontal or vertical number of pixels of the entire display.

As described above, according to the image processing device of this embodiment, video images are displayed so as to be arranged not in close proximity to each other but at a predetermined distance from each other. This reduces an influence exerted by two video images on each other, thereby allowing a user to perform a precise adjustment of a video image.

In order to further prevent a visual influence from being exerted on video images, it is desirable that the boundary line 39 have a color verging on an achromatic color.

Furthermore, although this embodiment has been explained using the example of a resolution of XGA, a similar effect is obtained also in the case of using other resolution values.

Embodiment 5

A projector device as an image processing device according to Embodiment 5 of the present invention has the same basic configuration as that of the image processing device according to Embodiment 1.

Figure 10:
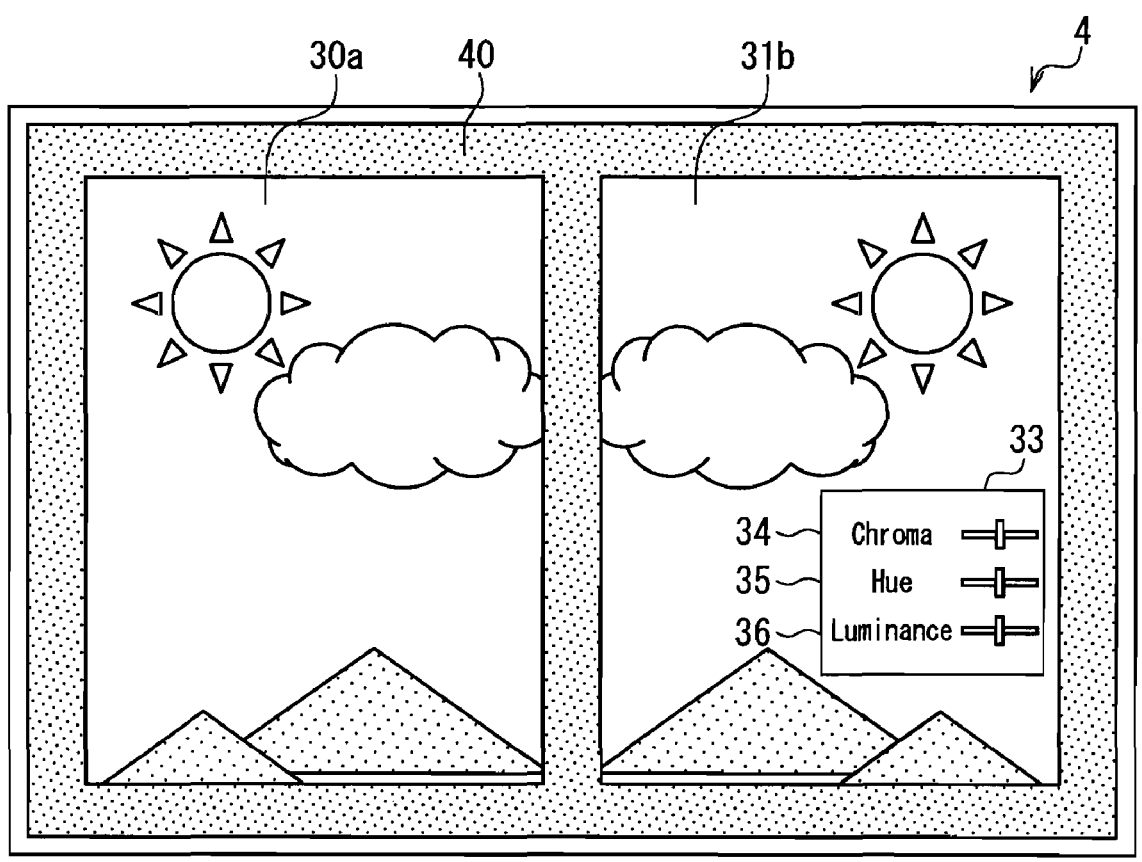
FIG. 10 is a diagram showing an image adjustment screen displayed by a projector device according to Embodiment 5 of the present invention.
Figure 11:
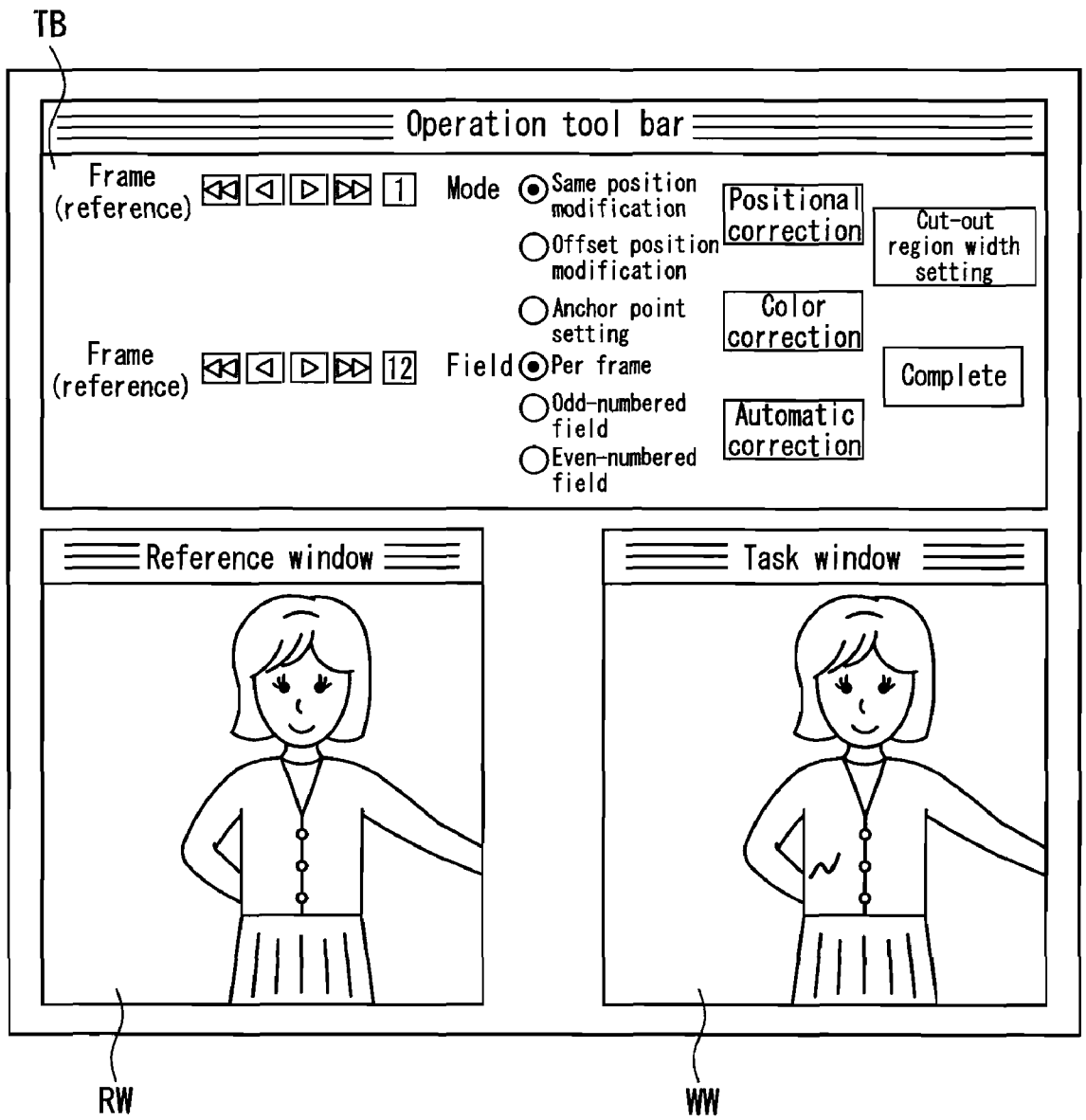
FIG. 11 is a diagram showing a display screen in a conventional image display device.

The following describes this embodiment, with a particular emphasis on the difference from the projector device according to Embodiment 1. FIG. 10 is a diagram showing a video image adjustment screen in the projector device according to Embodiment 5. The difference from the image processing device according to Embodiment 1 is that an isolation frame 40 having a predetermined width is provided at an outer peripheral portion of a video image.

The description is directed next to the isolation frame 40 at an outer periphery of a video image in this embodiment. For example, in the case of XGA (horizontal 1024 pixels by vertical 768 pixels), an isolation frame having a width corresponding to 51 or more pixels that are $\frac{1}{20}$ the horizontal number of pixels is displayed around each of a first video image 31a and a second video image 31b.

This configuration is employed for the purpose of avoiding a phenomenon in which when displayed in a slightly reduced size in such a manner as to overlap a video image displayed throughout the screen 4, the above-described two video images 31a and 31b may be influenced by the whole video image. That is, this embodiment is premised not on the case where the two video images 31a and 31b are displayed so as to spread throughout the screen 4 as shown in the figures of the above-described embodiments but on the case where the two video images 31a and 31b are displayed in a size smaller than the whole size of the screen 4 as shown in FIG. 10.

In this case, it is desirable that the isolation frame 40 have a width corresponding to $\frac{1}{20}$ to $\frac{1}{10}$ the horizontal or vertical number of pixels of the entire display.

As described above, according to the image processing device of this embodiment, video images are displayed at a distance from an arranged whole video image by the isolation frame 40 provided at an outer periphery of each of the video images, thereby allowing a user to perform a precise adjustment of a video image without an influence exerted by the whole video image.

Similarly to the case of Embodiment 4, it is desirable that the isolation frame 40 provided at the outer periphery have a color verging on an achromatic color because this prevents a visual influence from being exerted on video images.

Furthermore, although this embodiment has been explained using the example of a resolution of XGA, a similar effect is obtained also in the case of using other resolution values.

INDUSTRIAL APPLICABILITY

The image display device according to the present invention allows an influence of a visual effect to be reduced, which is exerted when two video images to be contrasted with each other are displayed in a row so that a video image adjustment can be performed, and thus facilitates an adjustment desired by a user, thereby being useful particularly as an image display device such as a projector or the like, with which a video image adjustment is performed by a user.

The invention claimed is:

1. An image display device, comprising:
a display part that displays a video image based on an input signal;
a video image adjusting part for adjusting a parameter of the video image;
a region selecting part for selecting a region in the video image, with respect to which an adjustment of the parameter is performed; and
a luminance difference detecting part that detects a luminance difference between left and right portions or upper and lower portions of the selected region,
wherein the display part is capable of composing, based on the video image in the selected region, a first video image before the adjustment of the parameter and a second video image to be used for the adjustment, displaying the first video image and the second video image above and below each other or side by side, and displaying one of the first video image and the second video image upside down or in a mirror-reversed manner relative to the other; and
the luminance difference determines whether to display an upside-down image or to display a mirror-reversed image.

2. The image display device according to claim 1, wherein the parameter comprises luminance.

3. The image display device according to claim 1, wherein the display part displays a boundary line between the first video image and the second video image, the boundary line having a width corresponding to $\frac{1}{20}$ to $\frac{1}{10}$ of a horizontal or vertical number of pixels of the whole video image.

4. The image display device according to claim 1, wherein the display part provides an isolation frame at an outer peripheral portion of the first video image or the second video image, the isolation frame having a width corresponding to $\frac{1}{20}$ to $\frac{1}{10}$ of a horizontal or vertical number of pixels of the whole video image.

5. The image display device according to claim 1, wherein the display part displays portions of the first video image and the second video image, which are desired to be compared, in close proximity to each other, by shifting the first video image or the second video image in a direction toward a boundary line between the first and second video images and eliminating overlapping portions of the first and second video images.

6. An image display device, comprising:
a display part that displays a video image based on an input signal;
a video image adjusting part for adjusting a parameter of the video image;
a region selecting part for selecting a region in the video image, with respect to which an adjustment of the parameter is performed; and
a color difference detecting part that detects a color difference between left and right portions or upper and lower portions of the selected region,
wherein the display part is capable of composing, based on a video image in the selected region, a first video image before the adjustment of the parameter and a second video image to be used for the adjustment, displaying the first video image and the second video image above and below each other or side by side, and displaying one of the first video image and the second video image upside down or in a mirror-reversed manner relative to the other, and
the color difference determines whether to display an upside-down image or to display a mirror-reversed image.

7. The image display device according to claim 6, wherein the parameter comprises luminance.

8. The image display device according to claim 6, wherein the display part displays a boundary line between the first video image and the second video image, the boundary line having a width corresponding to $\frac{1}{20}$ to $\frac{1}{10}$ of a horizontal or vertical number of pixels of the whole video image.

9. The image display device according to claim 6, wherein the display part provides an isolation frame at an outer peripheral portion of the first video image or the second video image, the isolation frame having a width corresponding to $\frac{1}{20}$ to $\frac{1}{10}$ of a horizontal or vertical number of pixels of the whole video image.

10. The image display device according to claim 6, wherein the display part displays portions of the first video image and the second video image, which are desired to be compared, in close proximity to each other, by shifting the first video image or the second video image in a direction toward a boundary line between the first and second video images and eliminating overlapping portions of the first and second video images.

11. An image display method comprising steps of:
displaying a video image based on an input signal;
adjusting a parameter of the video image;
selecting a region in the video image, with respect to which an adjustment of the parameter is performed; and
detecting a luminance difference between left and right portions or upper and lower portions of the selected region,
wherein in the displaying step,
based on a video image in the selected region, a first video image before the adjustment of the parameter and a second video image to be used for the adjustment are composed,
the first video image and the second video image are displayed above and below each other or side by side, and
the luminance difference determines whether one of the first video image and the second video image is to be displayed in an upside down image or to display a mirror-reversed image relative to the other.

12. An image display method comprising steps of:
displaying a video image based on an input signal;
adjusting a parameter of the video image;
selecting a region in the video image, with respect to which an adjustment of the parameter is performed, and
detecting a color difference between left and right portions or upper and lower portions of the selected region,
wherein in the displaying step,
based on a video image in the selected region, a first video image before the adjustment of the parameter and a second video image to be used for the adjustment are composed,
the first video image and the second video image are displayed above and below each other or side by side, and
the color difference determines whether one of the first video image and the second video image is to be displayed in an upside down image or to display a mirror-reversed image relative to the other.

* * * * *